United States Patent [19]

Ali

[11] Patent Number: 5,546,756
[45] Date of Patent: Aug. 20, 1996

[54] CONTROLLING AN ELECTRICALLY ACTUATED REFRIGERANT EXPANSION VALVE

[75] Inventor: Dawood A. Ali, Bloomingdale, Ill.

[73] Assignee: Eaton Corporation, Cleveland, Ohio

[21] Appl. No.: 385,406

[22] Filed: Feb. 8, 1995

[51] Int. Cl.⁶ .............................. F25B 41/04; F24F 3/14
[52] U.S. Cl. ........................... 62/204; 62/212; 236/78 D
[58] Field of Search ................................ 236/75, 78 D; 62/225, 212, 204, 226; 395/61, 900

[56] References Cited

U.S. PATENT DOCUMENTS 5,156,013  10/1992  Arima et al. ................. 236/78 D X
5,259,210  11/1993  Ohya et al. ..................... 395/61 X Primary Examiner—William E. Wayner
Attorney, Agent, or Firm—Roger A. Johnston

[57] ABSTRACT

A control system for generating a pulse width modulated control signal for an electrically operated refrigerant valve. The controller receives inputs from evaporator inlet and outlet temperature sensors ($T_{in}$, $T_{out}$) and "fuzzy" logic to compute the discrete value of pulse width change needed, based upon the difference $\Delta T = T_{out} - T_{in}$ and the time rate of change of $\Delta T$.

6 Claims, 4 Drawing Sheets

|   | R |   |   |   |   |
|---|---|---|---|---|---|
| ΔT | i | ii | iii | iv | v |
| a | 3 | 5 | 6 | 6 | 7 |
| b | 3 | 4 | 5 | 5 | 6 |
| c | 2 | 3 | 4 | 5 | 6 |
| d | 2 | 3 | 3 | 4 | 5 |
| e | 1 | 2 | 2 | 3 | 5 |

FIG. 6

| № | CONSEQUENCE | ΔPW |
|---|---|---|
| 1 | CLOSE LARGE | -30 |
| 2 | CLOSE MEDIUM | -20 |
| 3 | CLOSE SMALL | -10 |
| 4 | KEEP POSITION | 0 |
| 5 | OPEN SMALL | +10 |
| 6 | OPEN MEDIUM | +20 |
| 7 | OPEN LARGE | +30 |

FIG. 8

| MATRIX SET | MBRP ΔT | MBRP R | MBRP MIN. | CONSEQUENCE |
|---|---|---|---|---|
| a, i | .73 | .25 | .25 | 3 |
| a, ii | .73 | .75 | .73 | 5 |
| b, i | .27 | .25 | .25 | 3 |
| b, ii | .27 | .75 | .27 | 4 |

FIG. 7

| (MBRP MIN.) MAX. | CONSEQUENCE |
|---|---|
| 0 | 1 |
| 0 | 2 |
| .25 | 3 |
| .27 | 4 |
| .73 | 5 |
| 0 | 6 |
| 0 | 7 |

FIG. 9

CONTROLLING AN ELECTRICALLY ACTUATED REFRIGERANT EXPANSION VALVE

BACKGROUND OF THE INVENTION

The present invention relates to the control of the flow of refrigerant in a refrigeration or air conditioning system and particularly relates to control of refrigerant flow in mobile air conditioning systems of the type employed for cooling the passenger compartment in a vehicle. Heretofore, it has been common practice to employ a temperature responsive expansion valve for controlling flow of refrigerant to the endothermic heat exchanger or evaporator in the refrigeration or air conditioning system, which valve employed a fluid filled control chamber responsive to evaporator discharge temperature to create pressure on a diaphragm connected to operate a moveable valve member for controlling flow to the evaporator inlet. Such temperature responsive valves are commonly referred to as thermostatic expansion valves and have enjoyed widespread use in high volume production of passenger automobiles because of the relative low cost of manufacturing of such valves. However, such thermostatic expansion valves do require that the temperature sensing fluid chamber be hermetically sealed with the sensing fluid and thus have been prone to developing leakage in the sensing chamber over prolonged service.

Although temperature responsive thermostatic expansion valves have proven generally satisfactory for controlling refrigerant flow to the evaporator, such a device has the disadvantage that it can only react to the result of a change in ambient conditions or thermal load on the evaporator for control purposes; and, therefore control of the refrigerant flow lags the need for change. Thus, it has been desired to provide an electrically controlled expansion valve which can be controlled by a signal generating circuit which employs a "smart" control signal developed by a microcomputer receiving inputs from sensors identifying the changes in ambient conditions. Such an arrangement with an electrically controlled expansion valve can thus be designed to anticipate the need for change in refrigerant flow responsive to extreme or rapid changes in ambient conditions or thermal load on the evaporator. The problem of providing refrigerant flow control in a passenger vehicle air conditioning system in response to extreme or rapid change of ambient conditions or thermal load on the evaporator is particularly complicated or aggravated by the rapid changes in the speed of the compressor which is normally driven by a belt connected to the vehicle engine power shaft. Thus, in extreme conditions of sun load and high ambient temperatures with the vehicle engine idling, full flow is required; whereas, as the engine speed comes off idle sudden throttling is required in view of the almost instantaneous increase in refrigerant flow as compressor RPM increases with engine speed.

Thus it has been desired to provide a way or means or strategy for controlling an electrically operated expansion valve which is particularly suited to global air conditioning systems where rapid changes in ambient conditions are encountered.

SUMMARY OF THE INVENTION

An object of the present invention is to provide a strategy for generating an electrical control signal for an electrically operated refrigerant expansion valve.

It is a further object of the present invention to provide a control strategy for generating an electric control signal for operating an expansion valve in a mobile or vehicle air conditioning system.

It is a further object of the present invention to provide a control strategy for generating a pulse width modulated electrical control signal for operating an electric expansion valve in a vehicle air conditioning system.

It is a further object of the present invention to provide a control strategy for generating a pulse width modulated control signal with "fuzzy" logic or inference techniques for operating an expansion valve for controlling flow to the evaporator in a vehicle air conditioning system.

The present invention employs circuit means for determining the temperature difference ($\Delta T$) of signals from sensors providing evaporator inlet ($T_{in}$) and outlet ($T_{out}$) temperature and determining also the time rate of change (R) of $\Delta T$. The degree of membership of R and $\Delta T$ in each of predetermined bands of R and $\Delta T$ is determined; and, for combinations of the degrees of membership of R and $\Delta T$ the change in control signal $\Delta PW$ is determined for a predetermined set of consequences. The weighted average of the portions corresponding to the bandwidths is determined and from that a discrete value of control signal for the weighted average is calculated.

BRIEF DESCRIPTION OF THE DRAWINGS

FIG. 6 is a matrix of the consequences for the minimums of the possible combinations of consequences FIG. 3 or 4 and FIG. 5;

FIG. 7 is a table showing the actual values of membership for the points marked on FIG. 6;

FIG. 8 is a table identifying the consequences employed in the matrix of FIG. 6; and, FIG. 9 is a table showing the maximums of the minimums for each consequence in FIG. 6 for the points identified on the graphs of FIG. 3 and FIG. 5.

DETAILED DESCRIPTION

Figure 1:
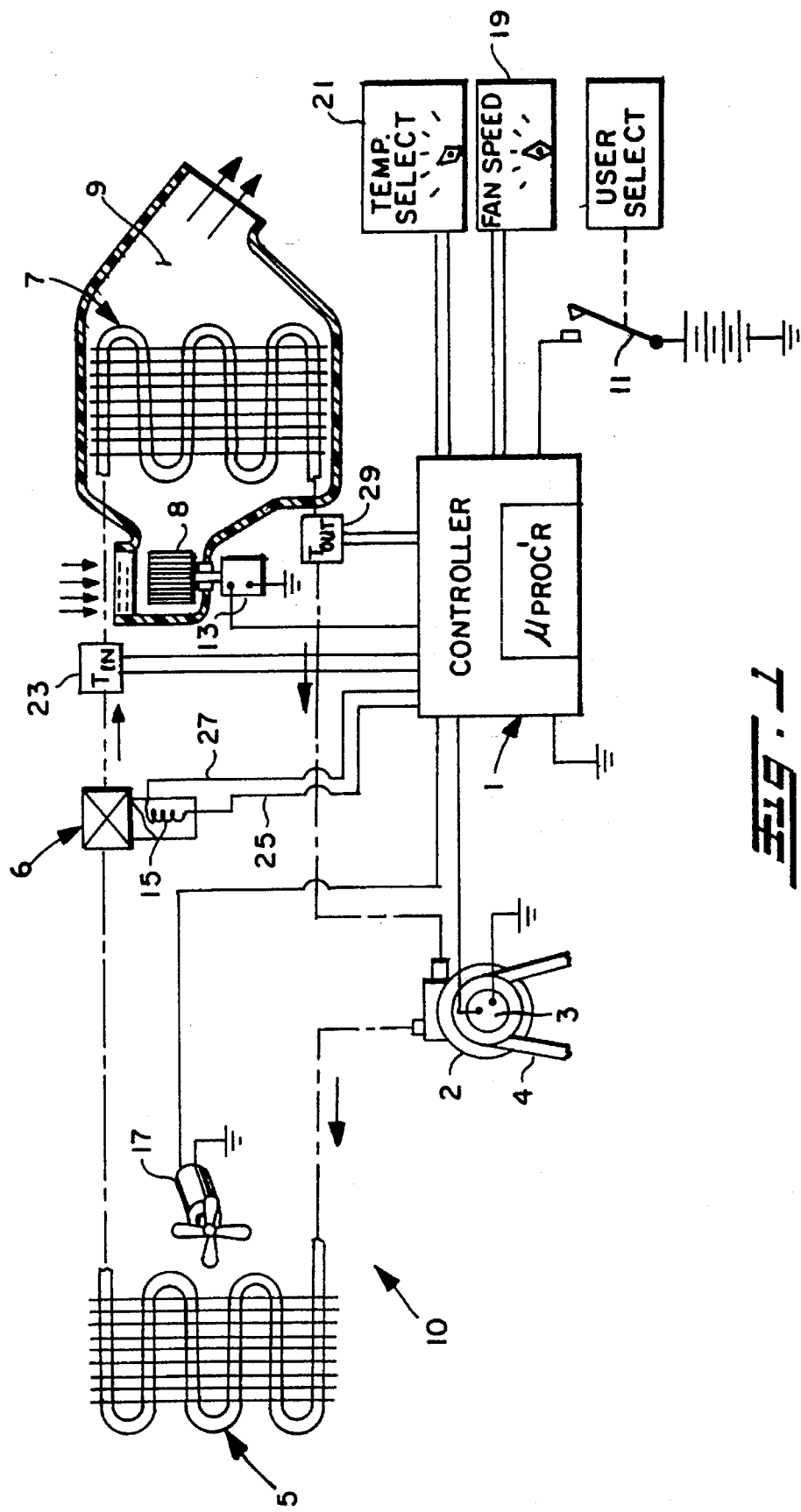
FIG. 1 is a pictorial of an automotive air conditioning system employing the present invention.

Referring to FIG. 1, the system is started typically by user closing of a switch 11 to connect power to the microprocessor based controller indicated generally at 1 and compressor 2 by clutch 3 as is well known in the art. The compressor 2 driven by engine belt 4 supplies high pressure refrigerant through condenser 5 to an electric expansion valve indicated generally at 6. Valve 6 supplies an evaporator indicated generally at 7 over which air is blown by fan 8 which discharges air through plenum 9 to the vehicle passenger compartment. Fan 8 is driven by a motor 13 connected to controller 1 as is electric operator 15 for valve 6 and also condenser fan motor 17. Typically, user controls for the speed of fan 8 and for setting the desired compartment temperature are provided as denoted respectively by reference numerals 19, 21. It will be understood that the controls and controller 1 may be provided in accordance with known circuitry techniques; and, controller 1 includes a pulse generator and known techniques for modulating the width of the pulse. The controller outputs the pulse signal along leads 25,27 to operator 15.

Figure 2:
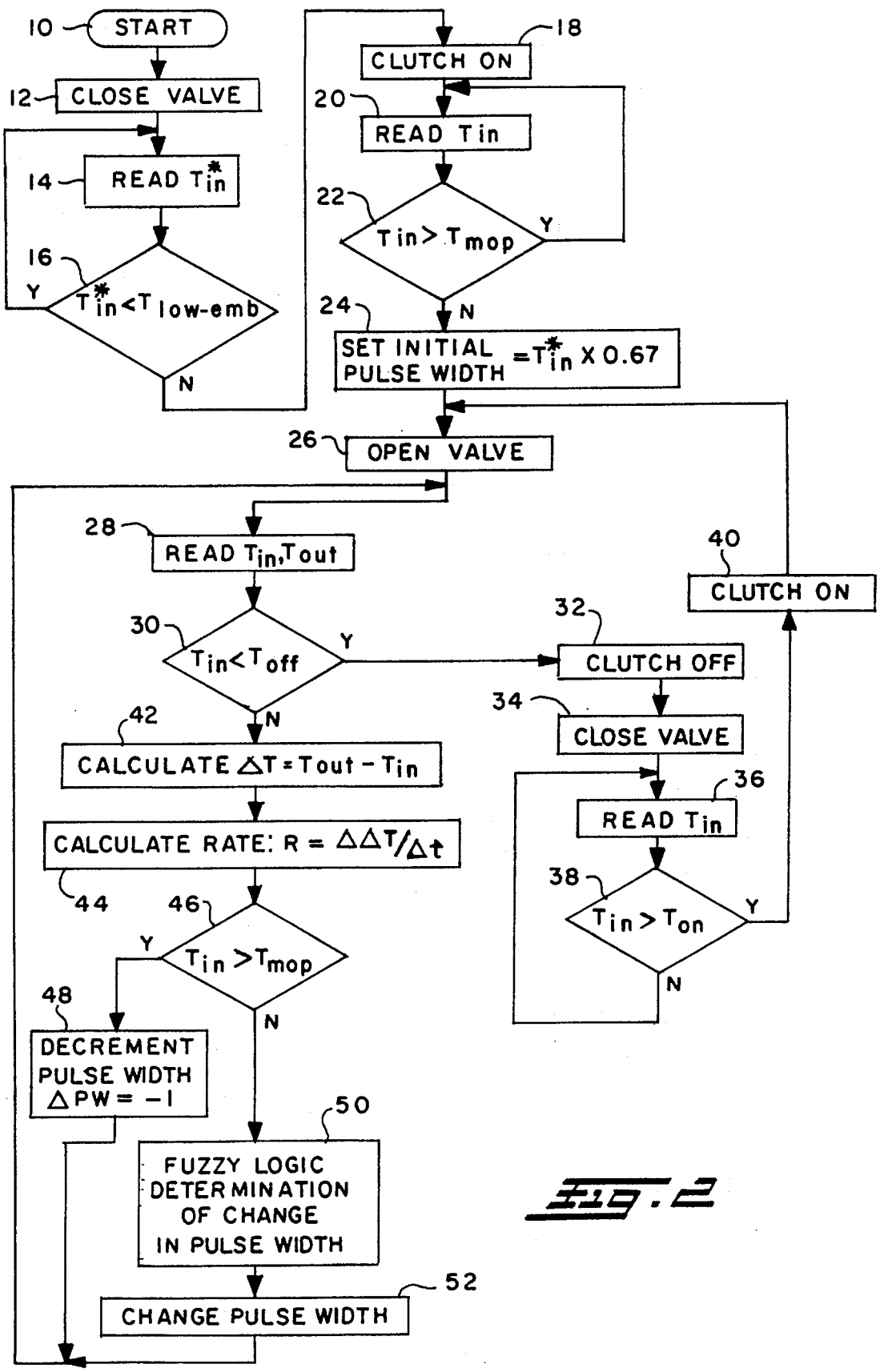
FIG. 2 is a flow diagram of the control strategy of the present invention.

Referring to FIG. 2, the system operates to provide an absence or a pulse having a zero width control signal to close the electrically operated valve at step 12.

The system then reads the evaporator inlet temperature from a sensor 23 appropriately disposed in the refrigerant line and the value with the valve closed is denoted $T_{in}^*$ at step 14. The system then proceeds to compare $T_{in}^*$ with a predetermined low ambient cut out temperature denoted $T_{low-amb}$ at step 16. If the comparison at step 16 indicates that $T_{in}^*$ is less than the low ambient cut out temperature the system recycles to step 14. However, in the event that $T_{in}^*$ is not less than the low ambient cut out temperature denoted by the output N in step 16, the system proceeds to electrically engage the compressor clutch 3 at step 18 and again reads the evaporator inlet temperature $T_{in}$ at step 20.

The system then proceeds to compare at step 22 whether $T_{in}$ is greater than a predetermined cutoff temperature indicative that the high side pressure from the system condenser (not shown) is above a predetermined maximum denoted by $T_{mop}$. If the comparison is in the affirmative at step 22, meaning that the system is at or above maximum operating pressure, the control system recycles to step 20. However, if the comparison of step 22 is in the negative, meaning that the system is below the temperature corresponding to the maximum operating system pressure, the system then proceeds to set the initial pulse width at step 24. The pulse width at step 24 is set at approximately two-third (0.67) of value $T_{in}^*$ and, this has been found satisfactory for systems operating with a pressure drop across the evaporator ($\Delta P_{evap}$) on the order of 5 to 15 psi.

The system then proceeds with the initial pulse width determined in step 24 to open the valve at step 26 with the aforesaid pulse width and proceeds to step 28 to again read $T_{in}$ and the evaporator discharge temperature $T_{out}$ from sensor 29 at step 28. In the presently preferred practice, sensors 23,29 comprise thermistor devices; and, if desired, the sensors may be disposed with the valve body. The control system then proceeds to make a determination at step 30 as to whether $T_{in}$ is less than the compressor cutout temperature or "OFF" temperature denoted $T_{off}$; and, if the determination is affirmative the system proceeds to step 32 to cut off the compressor clutch and proceeds to step 34 to close the expansion valve. From step 34 the system then again reads $T_{in}$ at step 36 then proceeds to make a determination at step 38 as to whether $T_{in}$ is greater than the compressor "ON" temperature $T_{on}$ and if in the affirmative proceeds to energize the compressor clutch again at step 40 and proceeds to return to step 26.

If the determination at step 38 is negative the system returns to step 36.

If the determination at step 30 is negative the system proceeds to calculate the difference between the evaporator outlet temperature and the evaporator inlet temperature denoted $\Delta T = T_{out} - T_{in}$ at step 42 and then proceeds to calculate the time rate of change of $\Delta T$ at step 44 denoted $R = \Delta \Delta T / \Delta t$.

The system then proceeds to step 46 to make a determination as to whether $T_{in}$ is greater than the temperature corresponding to the maximum allowed system operating pressure $T_{mop}$; and, if the determination at step 46 is positive, the system decrements the pulse width by a-1 at step 48 and returns to step 28.

However, if the determination at step 46 is in the negative, the system proceeds to step 50 and determines the change of pulse width $\Delta PW$ in accordance with the "fuzzy" logic as will hereinafter be described.

Figure 3:
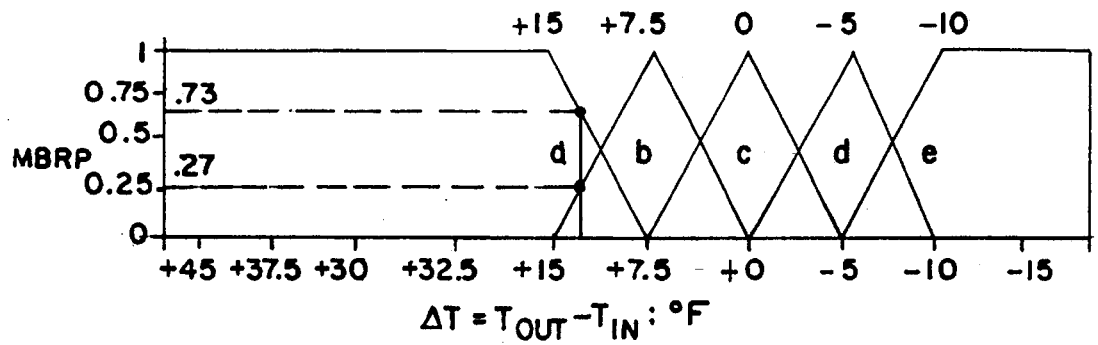
FIG. 3 is a graphical presentation of membership for plural overlapping bands of $\Delta T$'s for an evaporator having a pressure drop of 12 psi.
Figure 4:
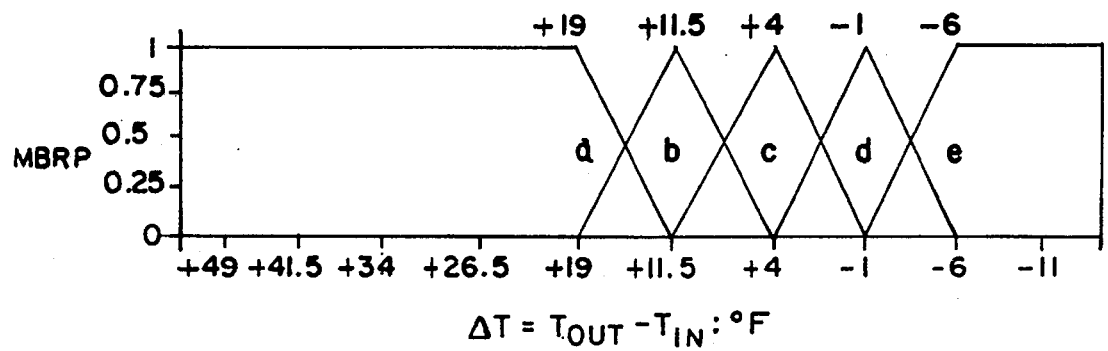
FIG. 4 is a graphical presentation similar to FIG. 3 for an evaporator having a pressure drop of 8 psi.

Referring to FIG. 3, a membership graph is illustrated for values of $\Delta T$ ranging from +45° F. to −15° F. in five overlapping bands, three of which are triangular and two end bands of trapezoidal shape, and with band "c" having its apex at 0 and base width of 12.5° F. band "b" having its apex at +7.5° F. with a base width of 15° F. band "a" having its apex at +15° F. with base extending from +7.5 to +∞, band "d" having its apex at −5° F. with a base width of 10° F. and band "e" having its apex at −10° F. with a base extending from −5 to −∞. The graphical presentation in FIG. 3 in the presently preferred practice is that which would be employed for an evaporator having a pressure drop thereacross of 12 psi (82.7 kPa).

For the purposes of illustration a sample measured value of $\Delta T=13°$ F. has been plotted in FIG. 3 and is shown as intersecting both triangles "a" and "b". The intersection of triangle "a", when projected to the membership axis indicates a value of 0.73; and, the intersection of triangle "b" projected to the membership axis indicates a value of 0.27.

Figure 5:
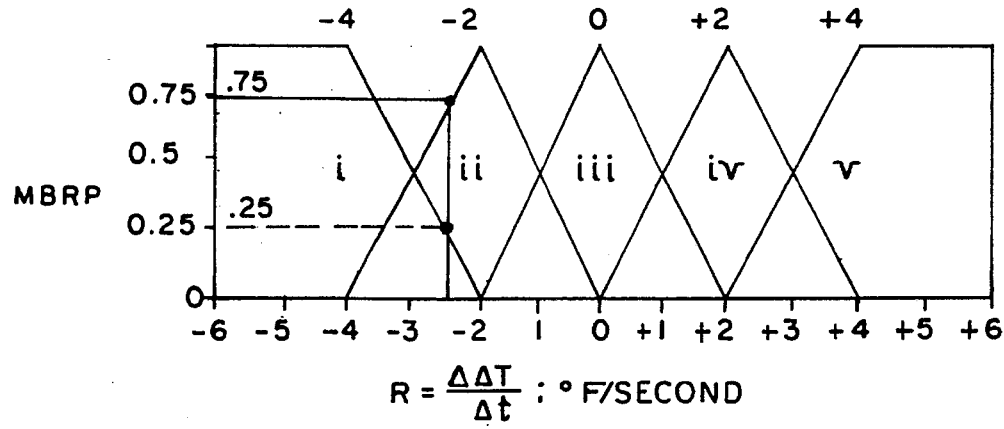
FIG. 5 is a graphical presentation similar to FIG. 3 for plural overlapping bands of the time rate of change of $\Delta T$.

Referring to FIG. 5, a graph is illustrated of membership value for bands of values of the rate $R=\Delta \Delta T/\Delta t$ for the five bands, three having a base width of 4° F. per second with the central band denoted "iii" having its apex at 0, band "ii" having its apex at −2, band "i" having its apex at −4 and base extending from −2 to −∞, band "iv" having its apex at +2 and band "v" having its apex at +4 and base extending from +2 to +∞.

For purposes of illustration and by way of example, a typical value of $R=-2.5$ has been plotted and intersects the two bands "i" and "ii" indicated by the black dots in FIG. 5. The projection of the intersection for triangle "i" projected to the membership axis indicates a membership value of 0.25; and, the projection of the intersection of the triangle "ii" onto the membership axis indicates a membership level of 0.75.

Thus, for the chosen illustrative sensor values of $\Delta T=+13°$ F. and $R=-2.5°$ F. per second it will be seen that the "sense" or combinations of memberships relates to the data combinations "a,i"; "a, ii"; "b,i"; and "b,ii" which combinations or sets are represented in the matrix of FIG. 6 as the cross-hatched squares.

Referring to FIG. 7, the membership values are set forth in tabular form for each of the matrix sets cross-hatched in FIG. 6; and, the minimum for each set is chosen and entered into the third column in the table of FIG. 7. It will be seen that if the table in FIG. 7 is extended to include all matrix locations of FIG. 6, all entries in the third column (MBRP-$_{MIN}$) will be zero except the entries listed in FIG. 7.

Referring to FIGS. 6 and 8, it will be understood that the numerals entered into the matrix of FIG. 6 for each set of values of $\Delta T$ and R represent the corresponding numerical value for the consequence or value of change in pulse width $\Delta PW$ shown in FIG. 8. Thus, the numeral 3 in set "b,i" in FIG. 6 represents a "small" consequence or change in $\Delta PW$ of −10 as determined from FIG. 8.

Referring to FIG. 9, for each of the matrix set of variables from FIG. 6 that is cross-hatched, the minimum membership is chosen and entered in the third column of FIG. 7; and, with reference to the fourth column of FIG. 7, it is noted that only consequences 3, 4 and 5 are relevant to the chosen values of $\Delta T$ and R.

Referring to FIG. 7, for each of the consequences 3, 4 and 5 the maximum value in the minimum membership column ($MBRP_{MIN}$) is chosen for all entries relating to the chosen consequence.

Referring to FIG. 9, the maximums obtained for each consequence from FIG. 7 are entered; and, it will be seen that except for consequences 3, 4 and 5 all entries are zero.

The values for the maximum of the minimum memberships for each of the relevant consequences from FIG. 9 are then used to compute the change in pulse width $\Delta PW$ by a weighted average of the entries in FIG. 9 according to the following formula:

$$\frac{\sum_{1-7} [(MBRP_{MIN})_{MAX} \Delta PW]}{\sum_{1-7} (MBRP_{MIN})_{MAX}} =$$

$$\frac{(0)(-30)+(0)(-20)+(.25)(-10)+(.27)(0)+(.73)(+10)+(0)(+20)+(0)(+30)}{0+0+0.25+0.27+0.73+0+0} =$$

$$\frac{-2.5+7.3}{1.25} = \frac{4.8}{1.25} = +3.84$$

It will be seen from the above procedure that a discrete value of the change in pulse width $\Delta PW$ can be calculated for a given set of evaporator inlet and outlet temperatures measured over a discrete period of time.

Referring to FIG. 2, upon completion of the calculation at step 50, the control system is operative to change the pulse width in accordance with $\Delta PW$ calculated in step 50 and the system responds accordingly at step 52 and then returns to step 28.

The present invention thus provides a strategy for operating an electrically operated expansion valve to control flow of refrigerant to an evaporator in a refrigeration system and which is particularly suitable for automotive air conditioning systems. The control system of the present invention employs "fuzzy" logic to calculate a discrete value of the pulse width for the expansion valve control signal from temperature sensors reading the temperature at the evaporator inlet and outlet.

Although the invention has hereinabove been described with respect to the illustrated embodiment, it will be understood that the invention is capable of modification and variation and is limited only by the following claims.

We claim:

1. A control system for a refrigeration system of the type having a compressor circulating refrigerant through a condenser, evaporator and an electrically operated expansion valve for controlling flow from the condenser to the evaporator, comprising:
   (a) first sensor means sensing the refrigerant temperature entering the evaporator and providing an electrical signal indicative thereof;
   (b) second sensor means sensing the refrigerant temperature discharging from the evaporator;
   (c) controller means operative to
      (i) determine the value of the difference ($\Delta T$) of said temperature signals,
      (ii) determine the degree of membership of said $\Delta T$ value in each of predetermined plural overlapping bands of $\Delta T$,
      (iii) determine the time rate of change (R) of $\Delta T$, from said $\Delta T$ signal,
      (iv) determine the degree of membership of said rate of change in each of predetermined plural overlapping bands of R,
      (v) determine for combinations of said degrees of membership the change in control signal ($\Delta PW$) from a predetermined set of rules (consequences),
      (vi) determine the discrete value for said change and including means to deenergize said compressor means when said evaporator refrigerant inlet temperature is less than a predetermined valve; and
   (d) circuit means connecting said controller to said expansion valve for applying said control signal thereto.

2. A control system for a refrigeration system of the type having a compressor circulating refrigerant through a condenser, evaporator and an electrically operated expansion valve for controlling flow from the condenser to the evaporator, comprising:
   (a) first sensor means sensing the refrigerant temperature entering the evaporator and providing an electrical signal indicative thereof;
   (b) second sensor means sensing the refrigerant temperature discharging from the evaporator;
   (c) controller means operative to
      (i) determine the value of the difference ($\Delta T$) of said temperature signals,
      (ii) determine the degree of membership of said $\Delta T$ value in each of predetermined plural overlapping bands of $\Delta T$,
      (iii) determine the time rate of change (R) of $\Delta T$, from said $\Delta T$ signal,
      (iv) determine the degree of membership of said rate of change in each of predetermined plural overlapping bands of R,
      (v) determine for combinations of said degrees of membership the change in control signal ($\Delta PW$) from a predetermined set of rules (consequences),
      (vi) determine the discrete value for said change including means operative to decrement said signal discrete value in the event said evaporator inlet temperature is greater than a predetermined value; and
   (d) circuit means connecting said controller to said expansion valve for applying said control signal thereto.

3. A control system for a refrigeration system of the type having a compressor circulating refrigerant through a condenser, evaporator and an electrically operated expansion valve for controlling flow from the condenser to the evaporator, comprising:
   (a) first sensor means sensing the refrigerant temperature entering the evaporator and providing an electrical signal indicative thereof;
   (b) second sensor means sensing the refrigerant temperature discharging from the evaporator;
   (c) controller means operative to
      (i) determine the value of the difference ($\Delta T$) of said temperature signals,
      (ii) determine the degree of membership of said $\Delta T$ value in each of predetermined plural overlapping bands of $\Delta T$,
      (iii) determine the time rate of change (R) of $\Delta T$, from said $\Delta T$ signal,
      (iv) determine the degree of membership of said rate of change in each of predetermined plural overlapping bands of R,
      (v) determine for combinations of said degrees of membership the change in control signal ($\Delta PW$) from a predetermined set of rules (consequences), (vi) determine the discrete value for said change including means to close said expansion valve while said initial system temperature at said valve inlet is above a predetermined limit value; and (d) circuit means connecting said controller to said expansion valve for applying said control signal thereto.

4. A method of controlling an electrically operated expansion valve in a refrigeration system having a compressor circulating refrigerant through an evaporator and condenser comprising:

(a) continuously sensing the temperature at the evaporator inlet and outlet;

(b) subtracting the value of the sensed inlet temperature from the sensed outlet temperature and determining the membership of the aforesaid difference ($\Delta T$) in overlapping bands of the difference;

(c) determining the time rate of change (R) of $\Delta T$ and determining the membership of R in overlapping bands of R;

(d) assigning pulse width increments to various combinations of (R) and $\Delta T$;

(e) determining the minimum membership for said various combinations and determining the maximum membership of all of said minimum for each assigned pulse width increment; and, determining the weighted average of said maximum membership for a percentage of pulse width increment.

5. The method defined in claim 4, wherein certain of said overlapping bands are configured as triangles.

6. The method defined in claim 4, wherein certain of said overlapping bands are configured as trapezoids.

* * * * *